United States Patent
Gapinski et al.

(10) Patent No.: US 9,981,680 B2
(45) Date of Patent: May 29, 2018

(54) ENERGY ABSORPTION MEMBER FOR A VEHICLE

(71) Applicant: Nissan North America, Inc., Franklin, TN (US)

(72) Inventors: Matthew Gapinski, West Bloomfield, MI (US); Gunnar Mason, Holly, MI (US); Travis James Parak, Shelby Township, MI (US); Jeffrey Mazur, New Baltimore, MI (US); Yayoi Okumura, Ebina (JP)

(73) Assignee: Nissan North America, Inc., Franklin, TN (US)

( * ) Notice: Subject to any disclaimer, the term of this patent is extended or adjusted under 35 U.S.C. 154(b) by 45 days.

(21) Appl. No.: 15/253,230

(22) Filed: Aug. 31, 2016

(65) Prior Publication Data

US 2018/0057039 A1    Mar. 1, 2018

(51) Int. Cl.
*B62D 1/19* (2006.01)
*B62D 7/20* (2006.01)
*B62D 25/14* (2006.01)

(52) U.S. Cl.
CPC .............. *B62D 1/197* (2013.01); *B62D 7/20* (2013.01); *B62D 25/14* (2013.01)

(58) Field of Classification Search
CPC .......... B62D 1/197; B62D 7/20; B62D 25/14
See application file for complete search history.

(56) References Cited

U.S. PATENT DOCUMENTS

| | | | | |
|---|---|---|---|---|
| 3,373,629 A | * | 3/1968 | Wight | B62D 1/192 180/78 |
| 3,373,630 A | * | 3/1968 | Heurtebise | B62D 1/192 180/78 |
| 3,665,777 A | | 5/1972 | Jensen | |
| 3,929,030 A | * | 12/1975 | Sukeshita | B62D 1/197 74/492 |
| 4,117,741 A | | 10/1978 | Yazane et al. | |
| 5,452,916 A | | 9/1995 | Beecher et al. | |
| 5,871,233 A | * | 2/1999 | Tanaka | B62D 1/184 280/777 |
| 6,027,088 A | * | 2/2000 | Stedman | B62D 1/195 248/200 |
| 7,748,742 B2 | | 7/2010 | Higashi et al. | |
| 7,942,446 B2 | | 5/2011 | Ridgway et al. | |

FOREIGN PATENT DOCUMENTS

EP          0606680 A1     7/1994

* cited by examiner

*Primary Examiner* — Faye M Fleming (57) ABSTRACT

A vehicle includes a vehicle support structure and a steering linkage. The vehicle support structure includes a dash wall. The dash wall separates an engine compartment and a passenger compartment. The dash wall has an energy absorption member supported by the support structure on an engine compartment side of the dash wall. The steering linkage extends through an opening of the dash wall between the engine compartment and the passenger compartment. The steering linkage includes a steering column in the passenger compartment. The steering linkage further includes an abutment. The abutment is positioned and configured to contact the energy absorption member upon a frontal impact of the vehicle to transfer energy from the steering linkage to the energy absorption member and to limit a rearward displacement of the steering linkage.

18 Claims, 11 Drawing Sheets

ENERGY ABSORPTION MEMBER FOR A VEHICLE

BACKGROUND

Field of the Invention

The present invention generally relates to an energy absorption member for a vehicle. More specifically, the present invention relates to a vehicle having an energy absorption member configured to absorb energy of a frontal impact of the vehicle.

Background Information

In many vehicles, the steering wheel is equipped with an airbag that deploys upon a frontal impact to cushion the reaction force of the driver's chest against the steering wheel. During a frontal impact to a vehicle, sometimes the vehicle steering linkage is displaced in a rearward direction towards the passenger compartment. This rearward displacement sometimes causes the steering column inside the passenger compartment to pivot from its original position. The pivoting of the steering column can also sometimes cause the airbag to deploy at a less than preferred angle. Thus, some vehicles are equipped with an energy absorption member to absorb the energy from the steering linkage after a frontal impact to limit the rearward displacement of the steering linkage. For example, a vehicle energy absorbing device is disclosed in U.S. Pat. No. 5,452,916. By limiting the amount of rearward displacement of the steering linkage, the pivot angle of the steering column is also limited.

SUMMARY

In view of the state of the known technology, one aspect of the present disclosure is to provide a vehicle with an energy absorption member supported by the vehicle support structure to transfer energy to the vehicle support structure.

In view of the state of the known technology and in accordance with a first aspect of the present disclosure, a vehicle is provided comprising a vehicle support structure and a steering linkage. The vehicle support structure includes a dash wall. The dash wall separates an engine compartment and a passenger compartment. The dash wall has an energy absorption member supported by the support structure on an engine compartment side of the dash wall. The steering linkage extends through an opening of the dash wall between the engine compartment and the passenger compartment. The steering linkage includes a steering column in the passenger compartment. The steering linkage further includes an abutment. The abutment is positioned and configured to contact the energy absorption member upon a frontal impact of the vehicle to transfer energy from the steering linkage to the energy absorption member and to limit a rearward displacement of the steering linkage.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
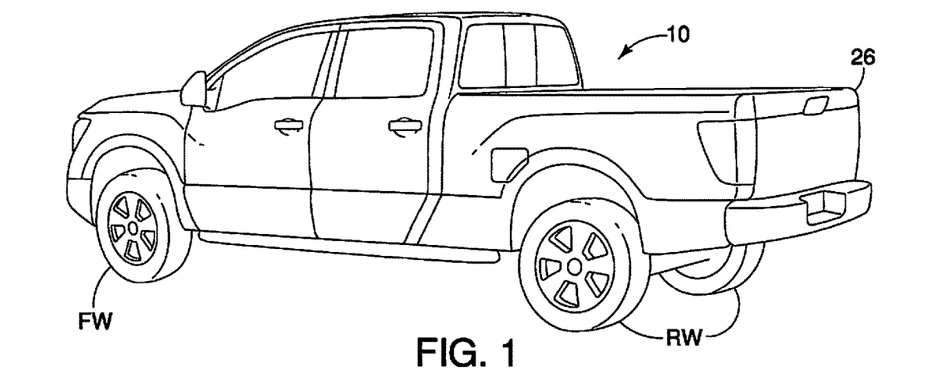
FIG. 1 is a rear perspective view of a vehicle that includes an energy absorption arrangement in accordance with an illustrated embodiment.
Figure 2:
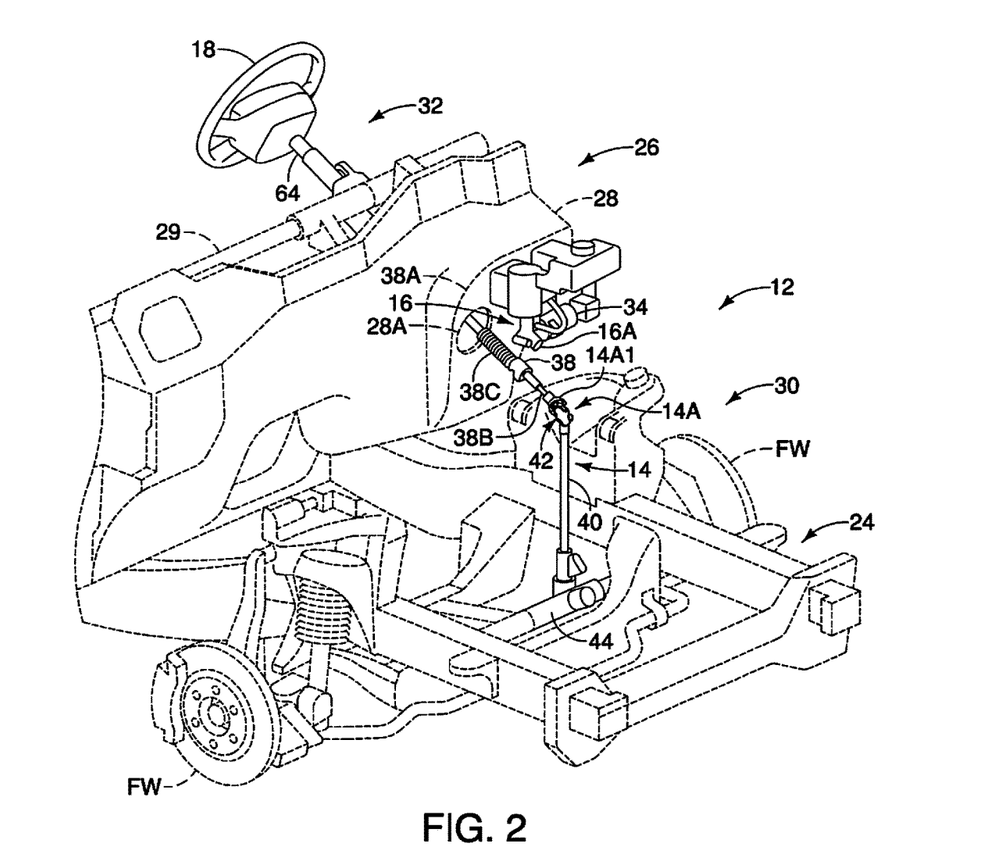
FIG. 2 is a front perspective view of a portion of a vehicle support structure of the vehicle of FIG. 1 showing a steering linkage extending between an engine compartment and a passenger compartment with the energy absorption arrangement limiting rearward displacement of the steering linkage in the event of a frontal impact.
Figure 3:
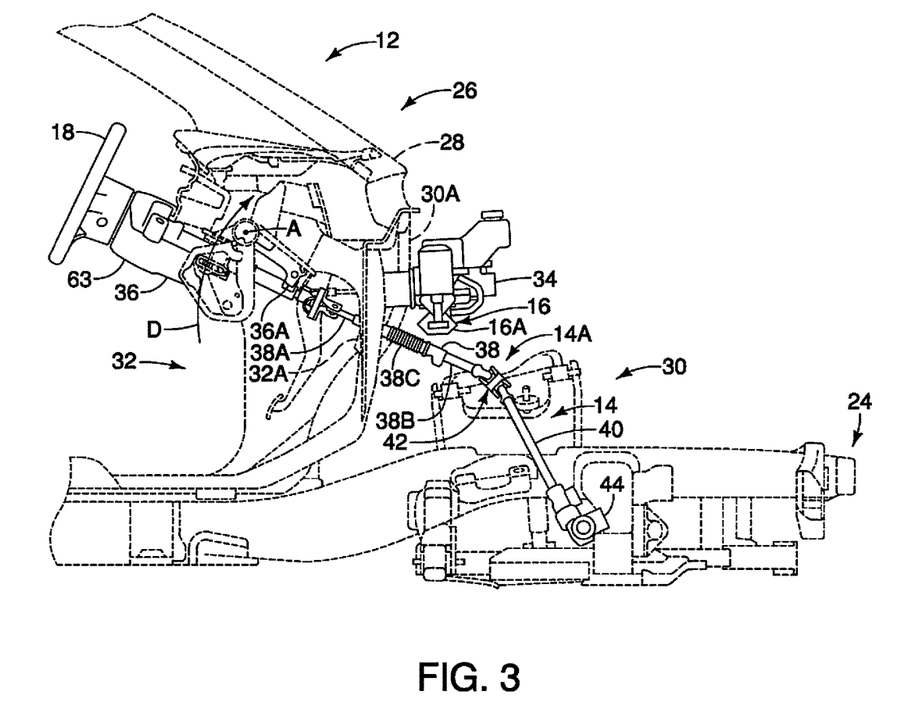
FIG. 3 is a side elevational view of the vehicle support structure of FIG. 2 showing the steering linkage and the energy absorption arrangement prior to a frontal impact.

Referring initially to FIGS. 1 and 2, a vehicle 10 is illustrated that is equipped with an energy absorbing arrangement in accordance with an illustrated embodiment. As seen in FIG. 2, the vehicle 10 includes a vehicle support structure 12 and a steering linkage 14. It will be apparent to one skilled in the art from this disclosure that the vehicle 10 includes other components that will not be discussed herein unless they help in the understanding of the present invention. The vehicle 10 further includes a pair of front wheels FW and a pair of rear wheels RW. The front wheels FW are operatively connected to the steering linkage 14 in a conventional manner. The vehicle support structure 12 is supported on the front wheels FW and the rear wheels RW.

Typically, during a frontal impact, the energy from the frontal impact causes deformation of the vehicle support structure 12. As a result of the deformation of a front portion of the vehicle support structure 12, the steering linkage 14 can be displaced in a rearward direction towards a driver. To limit this rearward displacement of the steering linkage 14, an energy absorption member 16 is provided on the vehicle support structure 12. The energy absorption member 16 is positioned along a deformation path of the steering linkage 14. In this way, a portion of the steering linkage 14 contacts the energy absorption member 16 during a frontal impact to limit further rearward displacement of the steering linkage 14. In the first embodiment, the energy absorption member 16 is a vehicle component that is attached to the vehicle support structure 12.

Figure 4:
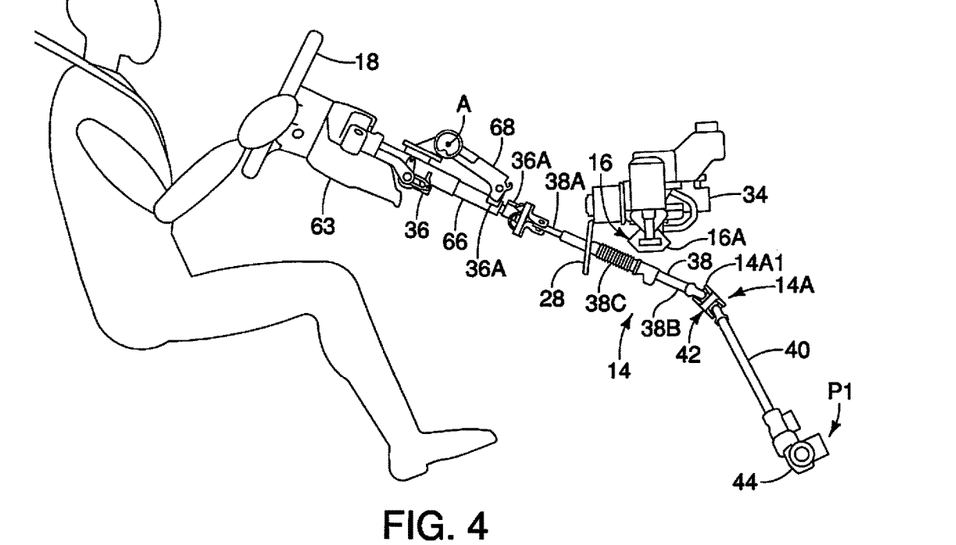
FIG. 4 is a side elevational view of the steering linkage of FIGS. 2 and 3 in a position prior to the frontal impact of the vehicle in which the steering linkage is not in contact an energy absorption member of the vehicle.
Figure 5:
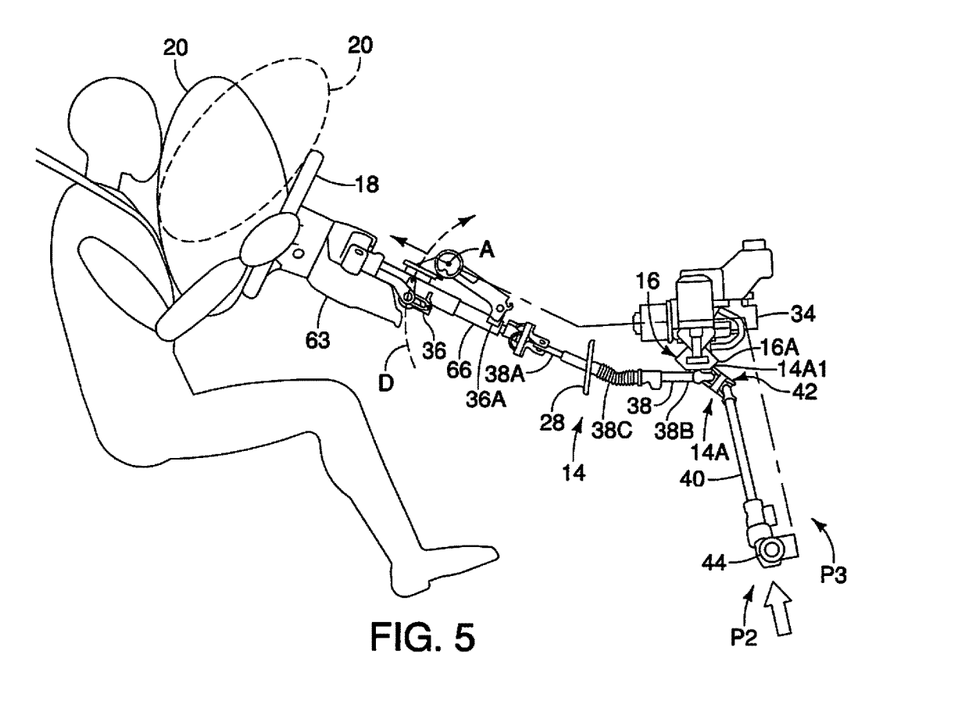
FIG. 5 is a side elevational view of the steering linkage of FIGS. 2 to 4 in a position after the frontal impact of the vehicle in which the steering linkage is contacting the energy absorption member and the airbag is deployed.

Referring now to FIGS. 2 to 5, the steering linkage 14 of the vehicle 10 includes a steering wheel 18. The steering wheel 18 includes an airbag 20 that is enclosed by a closure (not shown) that separates from the steering wheel 18 upon a frontal impact of the vehicle 10 to allow deployment of the airbag 20, as shown in FIG. 5. In the first embodiment, the steering linkage 14 further includes an abutment 14A. Here, in the first embodiment, the abutment 14A is a part of a constant velocity dual joint as explained below.

The abutment 14A is configured to contact the energy absorption member 16 which is supported on a location of the vehicle support structure 12 that is vertically above a portion of the steering linkage 14. The contact of the energy absorption member 16 and the abutment 14A transfers the energy from the frontal impact from the steering linkage 14 to the energy absorption member 16. The contact of the energy absorption member 16 and the abutment 14A will be further discussed below.

The vehicle support structure 12 will now be discussed. As seen in FIG. 2, vehicle support structure 12 basically includes a vehicle frame 24 and a vehicle body 26. The front and rear wheels FW and RW are supported by the vehicle frame 24. The vehicle body 26 is supported on the vehicle frame 24. While the vehicle 10 of the illustrated embodiments has a body-on-frame construction, it will be apparent to those skilled in the art that the present invention can be used with a uni-body construction. The vehicle body 26 of the vehicle support structure 12 further includes a dash wall 28. The dash wall 28 is constructed of any suitable rigid material such as a metallic material (e.g., steel). The dash wall 28 has reinforced portions, as needed and/or desired. For example, the reinforced portions can be constructed of thicker or higher strength steel. The dash wall 28 separates the vehicle body 26 into an engine compartment 30 and a passenger compartment 32. As will be later discussed, the steering linkage 14 extends through an opening 28A of the dash wall 28 between the engine compartment 30 and the passenger compartment 32.

As seen in FIG. 2, the energy absorption member 16 is supported by the vehicle support structure 12. In the first embodiment, the energy absorption member 16 is disposed in the engine compartment 30 of the vehicle 10. In particular, the dash wall 28 has the energy absorption member 16 which is supported at a reinforced portion of the dash wall 28. Thus, the energy absorption member 16 is supported on the dash wall 28 within the engine compartment 30. In the first embodiment, the energy absorption member 16 is part of a brake booster 34, which will be further discussed below.

Typically, during a frontal impact, the energy from the frontal impact causes deformation of the vehicle support structure 12. In particular, the vehicle frame 24 and the vehicle body 26 deforms in the rearward direction. As the vehicle support structure 12 deforms, the steering linkage 14 is displaced in the rearward direction. The rearward displacement of the steering linkage 14 can cause the steering linkage 14 in the engine compartment 30 to be partially displaced into the passenger compartment 32. As a result of this rearward displacement of the steering linkage 14 into the passenger compartment 32, the steering wheel 18 can pivot in a direction D (see FIG. 5) about an axis A. This upward pivoting of the steering wheel 18 can cause the airbag 20 to deploy at a less than preferred position (dashed line of airbag 20 in FIG. 5). Thus, the energy absorption arrangement of the illustrated embodiment is directed to limiting the rearward displacement of the steering linkage 14 to limit the pivoting of the steering wheel 18.

As stated previously, the steering linkage 14 extends from the engine compartment 30 into the passenger compartment 32. The steering linkage 14 includes a steering column 36, a first shaft 38, a second shaft 40, a joint 42 and a steering rack 44. As explained below, the joint 42 forms the abutment 14A that contacts the energy absorption member 16 (e.g., a part of the brake booster 34). The steering column 36 pivotally supports the steering wheel 18, and is disposed in the passenger compartment 32. The steering column 36 is mounted to a cross-bar 29 (FIG. 2) supported by the dash wall 28 on a passenger compartment side of the dash wall 28. In the illustrated embodiment, the steering column 36 includes a breakaway portion 36A which will be later discussed. The first shaft 38 is operatively connected to the steering column 36 in a conventional manner. The first shaft 38 constitutes an intermediate shaft of the steering linkage 14. The first shaft 38 extends between the passenger compartment 32 and the engine compartment 30 through the opening 28A of the dash wall 28. The second shaft 40 is disposed in the engine compartment 30. The second shaft 40 constitutes a lower shaft of the steering linkage 14. The joint 42 interconnects the first and second shafts 38 and 40 such that the first and second shafts 40 are angled with respect to each other. The connection between the first and second shafts 38 and 40 via the joint 42 will be further discussed below. The steering rack 44 is operatively coupled to the second shaft 40 and to the front wheels FW in a conventional manner. When a driver operates the steering wheel 18, a steering input is transferred from the steering wheel 18 through the components of the steering linkage 14 to steer the front wheels FW. In the illustrated embodiment, the steering linkage 14 is configured for a larger vehicle. It will be apparent to those skilled in the art from this disclosure that the energy absorption arrangement can be used with a smaller vehicle having a steering linkage with a single shaft and no joint. In such a case, the abutment can be a part that is added to the steering linkage at the appropriate location to contact the energy absorption member 16 (e.g., a part of the brake booster 34) during a frontal impact.

Sometimes, a conventional steering linkage will have a pair of deformable sections. That is, both the lower and intermediate shafts are configured to deform to absorb the energy from frontal impact. In the energy absorbing arrangement, by transferring the energy of the frontal impact from the steering linkage 14 to the vehicle support structure 12, only one of the first and second shafts 38 and 40 includes the deformable section while the other of the first and second shafts 38 and 40 is more rigid. The energy absorption arrangement decreases the cost of manufacturing and shipping of the steering linkage 14 by having only one deformable section.

As stated previously, the transfer from energy from the steering linkage 14 to the vehicle support structure 12 limits the rearward displacement of the steering linkage 14. In particular, a pivoting angle of the steering column 36 is limited. As best seen in FIGS. 4 and 5, the steering column 36 pivots about the pivot axis A where the steering column 36 is mounted to the cross-bar 29 of the dash wall 28. The steering column 36 can pivot in the direction D due to the rearward displacement of the steering linkage 14 causing the airbag 20 to deploy at a position depicted by dashed lines in FIG. 5, which is less than preferred. In the illustrated embodiment, the energy absorption member 16 is configured to contact the abutment 14A of the steering linkage 14 upon the frontal impact. In other words, the abutment 14A is positioned and configured to contact the energy absorption member 16 upon the frontal impact of the vehicle 10. The energy absorption member 16 is configured to withstand the energy absorption. Because the energy absorption member 16 is supported on the vehicle support structure 12, the energy from the frontal impact is dispersed to the vehicle support structure 12. The transfer of energy limits the rearward displacement of the steering linkage 14. Moreover, the contact of the abutment 14A and the energy absorption member 16 limits the pivoting of the steering column 36 resulting from the rearward displacement of the steering linkage 14.

As seen in FIG. 4, the steering linkage 14 is in a first position P1 (original position) that is prior to the frontal impact. FIG. 5 shows the steering linkage 14 in a position P2 (deformed position) which corresponds to a position after the frontal impact in which the steering linkage 14 contacts the energy absorption member 16. The airbag 20 deploys at a position shown by solid lines as a result of the steering linkage 14 contacting the energy absorption member 16 after the frontal impact. The dashed lines of FIG. 5 show approximately a position P3 of the steering linkage 14 after the frontal impact in which the steering linkage 14 does not contact the energy absorption member 16. As shown, the airbag 20 drawn in dashed lines corresponds to the position of airbag deployment in this instance, which is less than preferred.

The abutment 14A of the steering linkage 14 will now be discussed in greater detail with reference to FIGS. 4 to 8B. As shown, the abutment 14A is disposed on the joint 42. Specifically, the abutment 14A is part of the joint 42. In the illustrated embodiment, the joint 42 is shown as a constant velocity dual joint. Thus, in the illustrated embodiment, the abutment 14A is disposed on the constant velocity joint. It will be apparent to one skilled in the art from this disclosure that the joint 42 can be many types of joints as needed and/or desired to accommodate different steering linkage arrangements for different sized vehicles.

Figure 7:
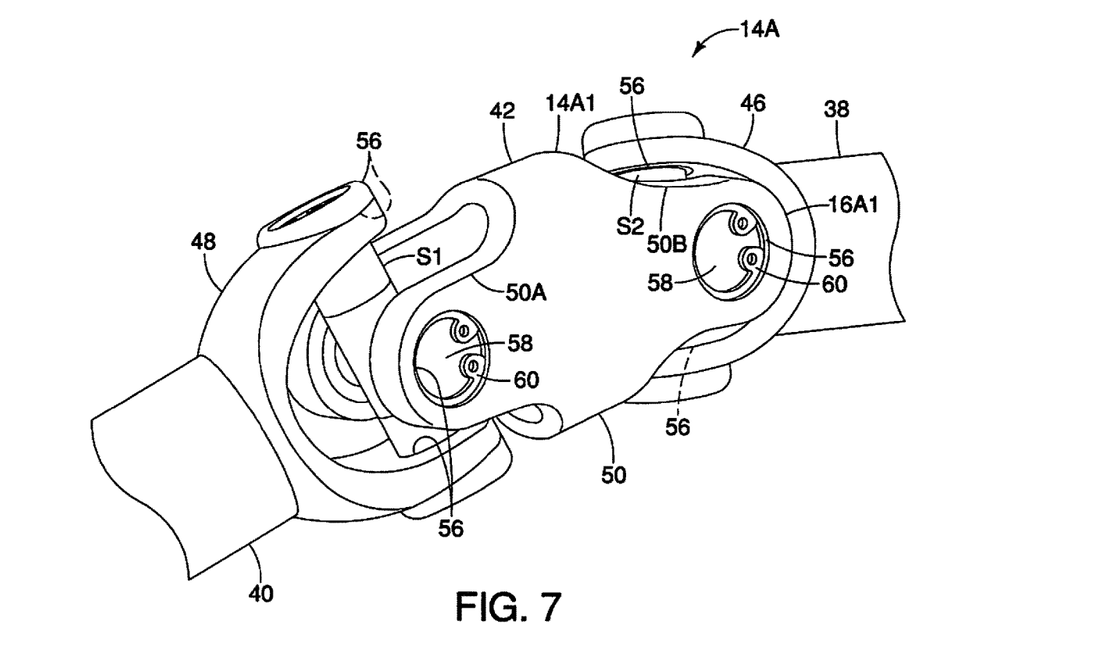
FIG. 7 is an enlarged perspective view of a joint of the steering linkage of FIGS. 2 to 6.
Figure 8A:
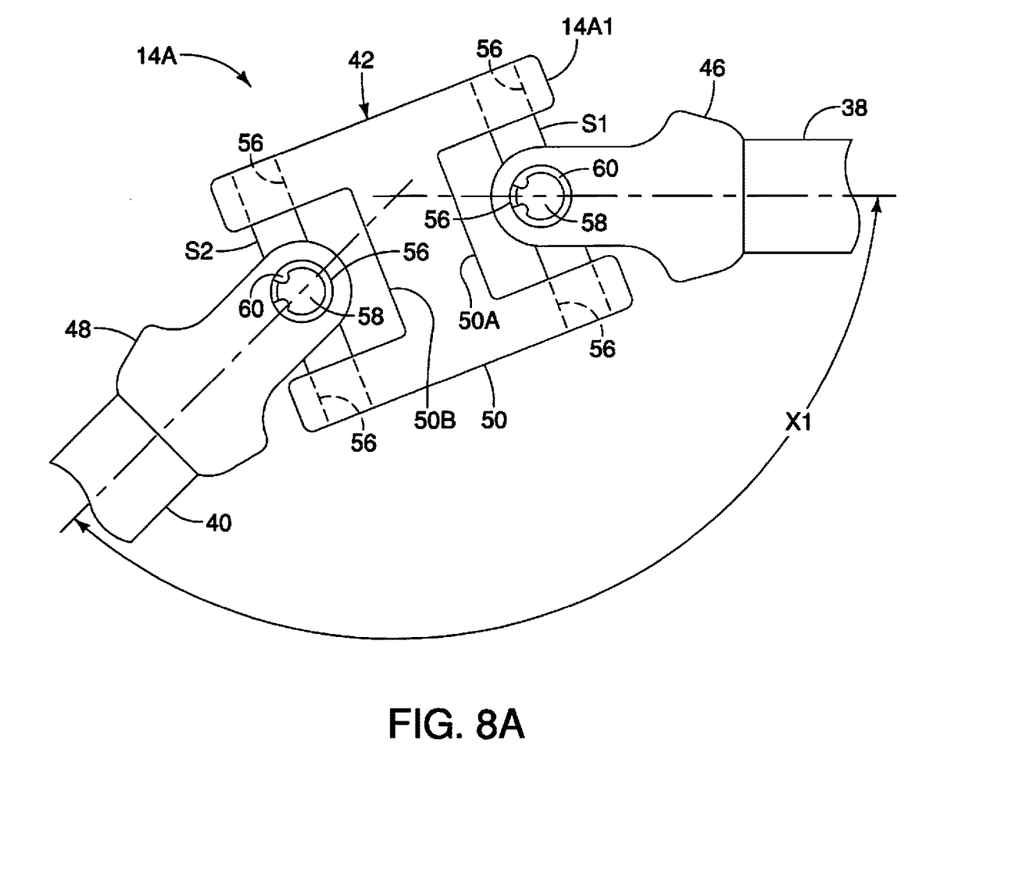
FIG. 8A is an enlarged side elevational view of the joint of FIG. 7 prior to a frontal impact.
Figure 8B:
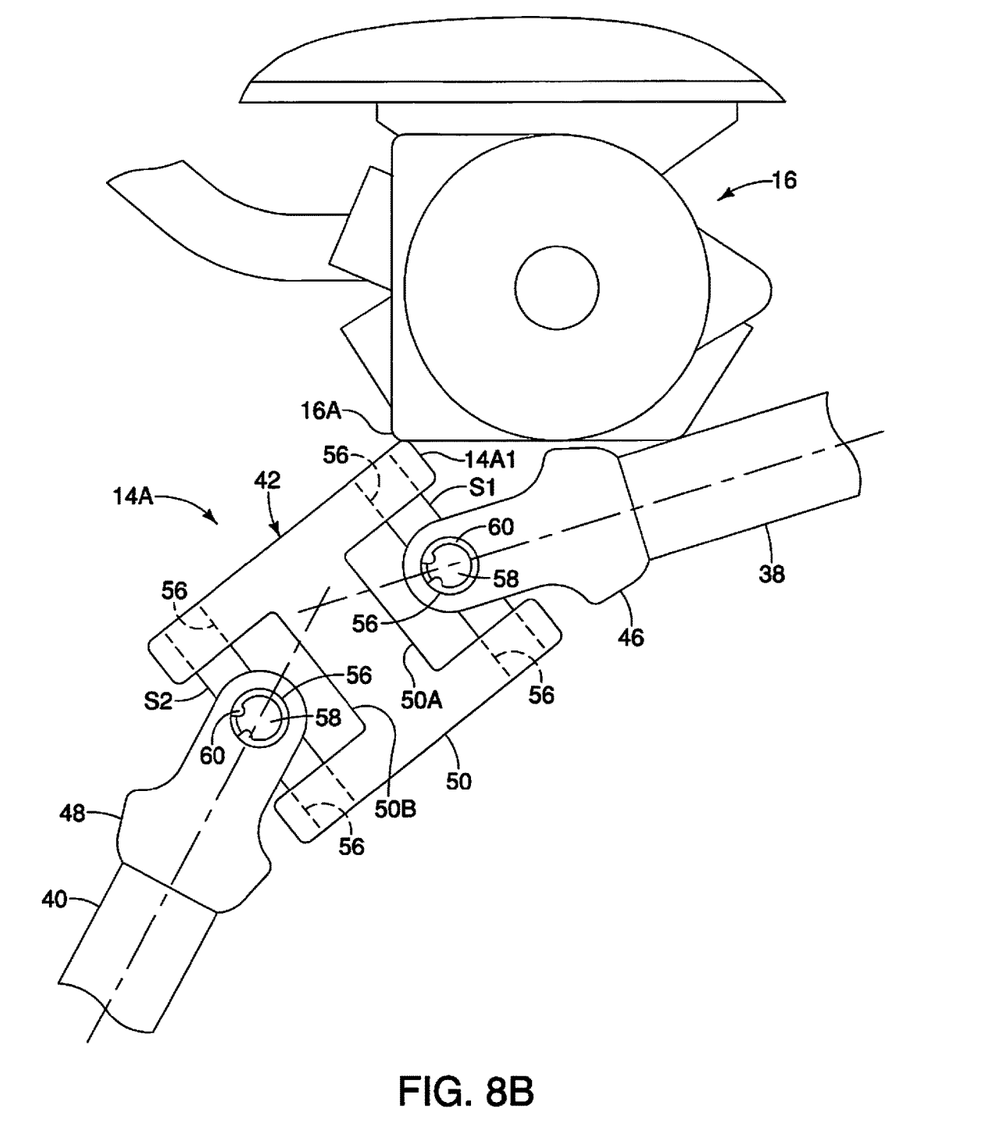
FIG. 8B is an enlarged side elevational view of the joint of FIGS. 7 and 8A in which the abutment of the joint is contacting the energy absorption member (brake booster) after a frontal impact without the snap rings of the joint being disengaged.
Figure 8C:
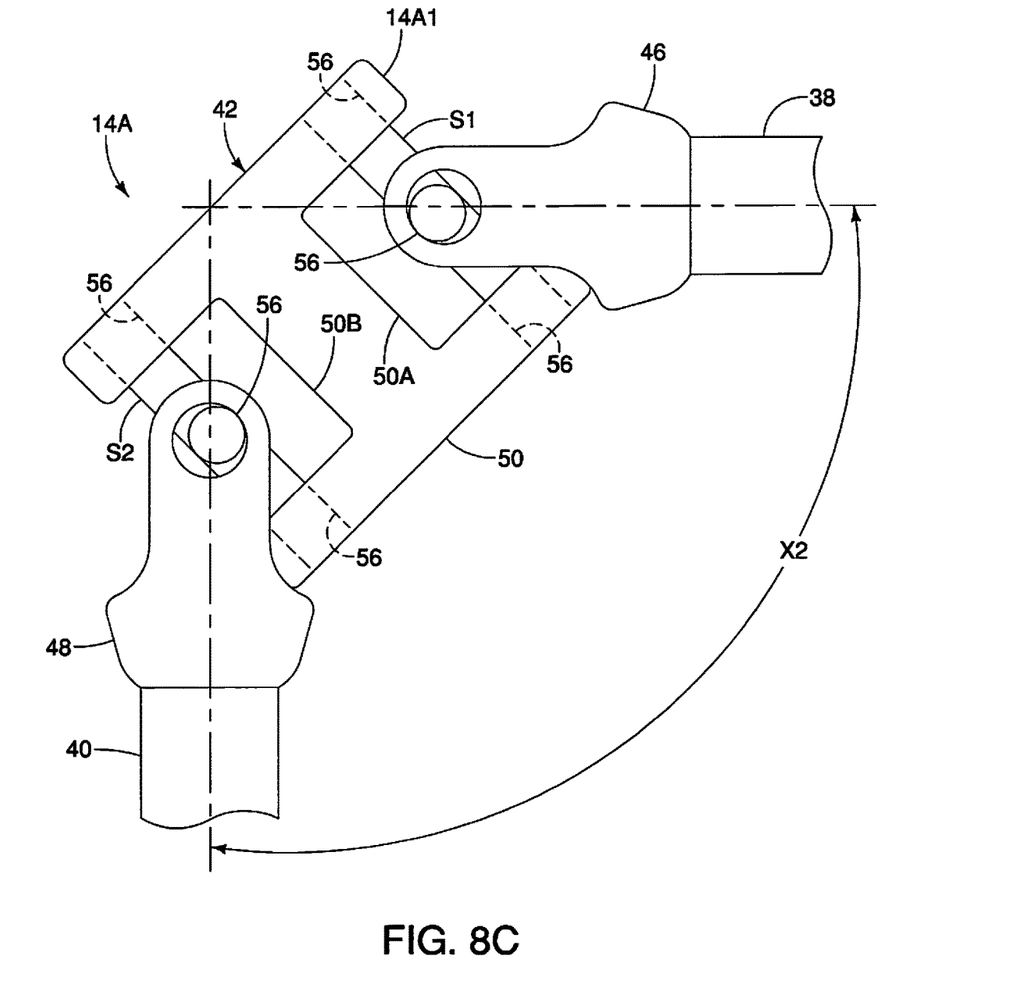
FIG. 8C is an enlarged side elevational view of the joint of FIGS. 7 and 8A showing the condition of the joint after contacting the energy absorption member as a result of a frontal impact with sufficient force to cause the snap rings of the joint to be disengaged.
Figure 9:
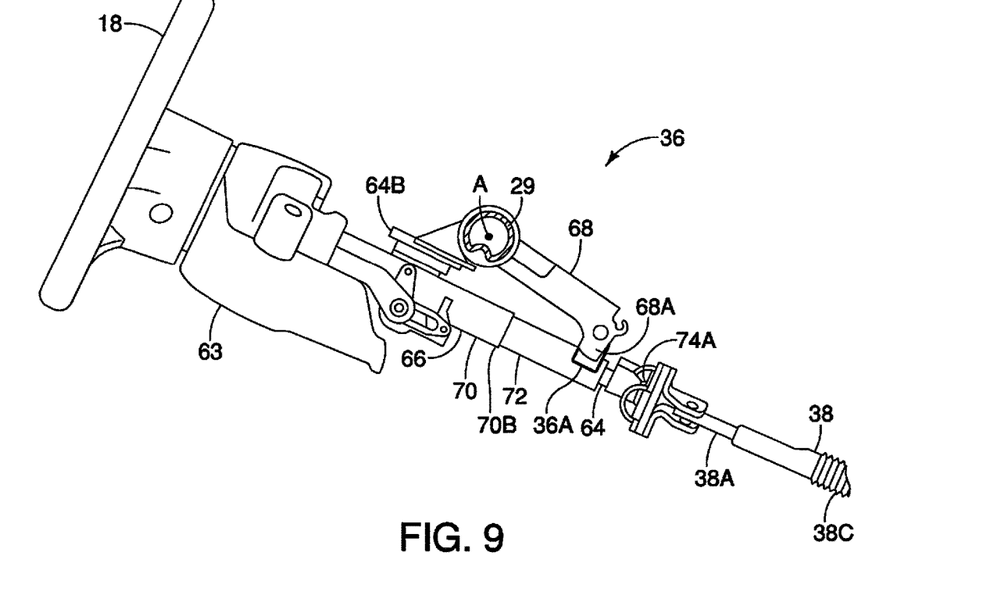
FIG. 9 is an enlarged side elevational view of portions of the steering linkage of FIGS. 2 to 6 to show components of the steering column.

Referring to FIGS. 7 to 8B, the joint 42 includes a first yoke 46, a second yoke 48 and a center yoke 50. The first yoke 46 is fixedly connected to the first shaft 38 in a conventional manner and the second yoke 48 is fixedly connected to the second shaft 40 in a conventional manner. The center yoke 50 connects the first and second yokes 46 and 48 via first and second spiders S1 and S2. The first spider S1 is disposed between a first yoke part 50A of the center yoke 50 and the first yoke 46 to couple the center yoke 50 and the first yoke 46 together as a first universal joint. The second spider S2 is disposed between a second yoke part 50B of the center yoke 50 and the second yoke 48 to couple the center yoke 50 and the second yoke 48 together as a second universal joint. Each of the yokes 46, 48 and 50 have a pair of journal receiving openings 56. Each of the spiders S1 and S2 has four journals (not numbered) that are received in the openings 56 of the first, second and center yokes 46, 48 and 50. The spiders S1 and S2 are secured to the first, second and center yokes 46, 48 and 50 by a plurality of bearing caps 58 and a plurality of snap rings 60. The bearing caps 58 are disposed over each of the journals of the spiders S1 and S2. The bearing caps 58 are secured to the spiders S1 and S2 within the openings 56 by the snap rings 60 in a conventional manner. The snap rings 60 are designed to pop out of the first, second and center yokes 46, 48 and 50 upon application of a prescribed load to the joint 42. Here, the abutment 14A is a part of the first yoke 46. Namely, a shoulder of the first yoke 46 includes the abutment 14A.

As shown in FIG. 5, upon frontal impact, the steering linkage 14 deforms to allow the joint 42 to contact the energy absorption member 16. In particular, the joint 42 contacts the energy absorption member 16 at the first yoke 46 after deformation of the steering linkage 14. Thus, in the illustrated embodiment, the abutment 14A is a part of the first yoke 46 of the joint 42. In the illustrated embodiment, the first yoke 46 is illustrated as including a flat lateral surface that is a contact surface 14A1 (FIGS. 6 and 7) that engages the energy absorption member 16 to limit rearward displacement of the steering linkage 14. It will be apparent to those skilled in the art from this disclosure that the energy absorption member 16 can be positioned such that the center yoke 50 or the second yoke 48 of the joint 42 can also contact the energy absorption member 16 to limit the rearward displacement of the steering linkage 14. In this case, the abutment 14A is a part of the constant velocity joint.

Depending on the force of the frontal impact, the snap rings 60 of the joint 42 can disengage from the first and second spiders S1 and S2 when the abutment 14A contacts the energy absorption member 16. The disengagement of the snap rings 60 allows an increased range of motion between the first and second yokes 46 and 48 with respect to each other. The increased range of motion allows for increased engagement of the abutment 14A and the energy absorption member 16 so that energy transfer is more efficient. As seen in FIG. 8A, an initial angle X1 between the first and second shafts 38 and 40 is approximately 135 degrees. After the abutment 14A impacts the energy absorption member 16 and the snap rings 60 are disengaged, the first and second shafts 38 and 40 are separated by an angle X2 of approximately 90 degrees, shown in FIG. 8B.

Figure 6:
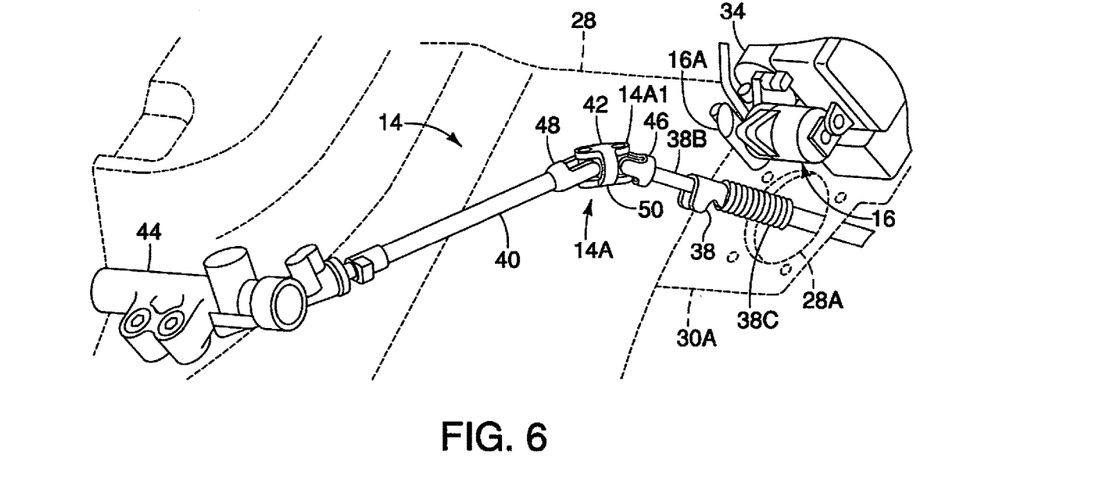
FIG. 6 is an enlarged perspective view of a portion of the vehicle support structure of FIGS. 2 and 3 showing the spatial relationship between the steering linkage and the energy absorption member.
Figure 14:
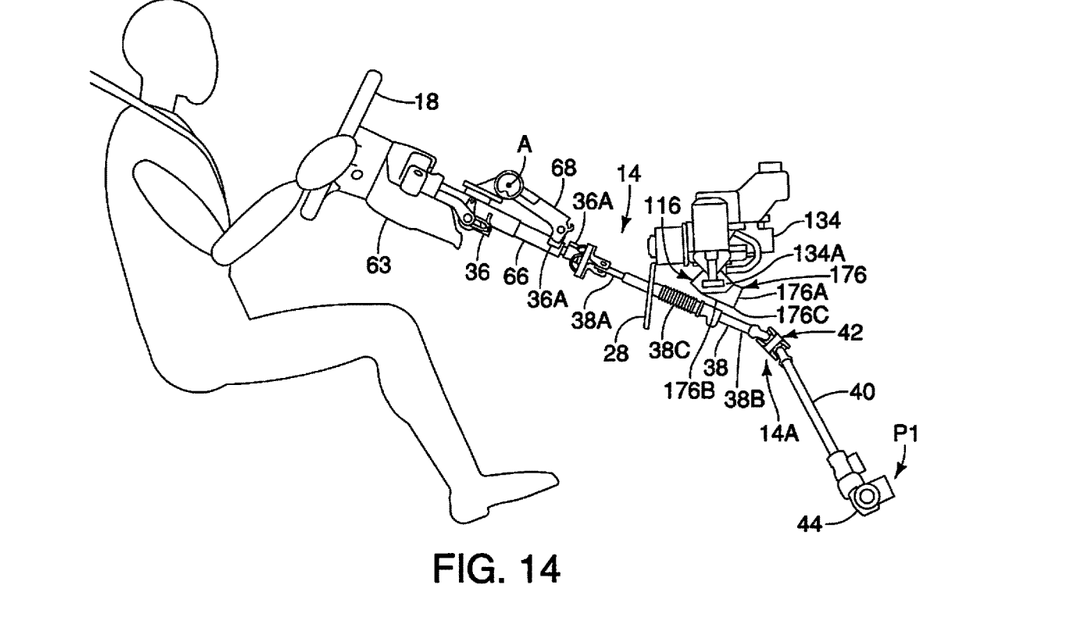
FIG. 14 is a side elevational view of the steering linkage of FIGS. 2 to 6 in the position prior to contacting the first modified energy absorption member of FIGS. 12 and 13.
Figure 15:
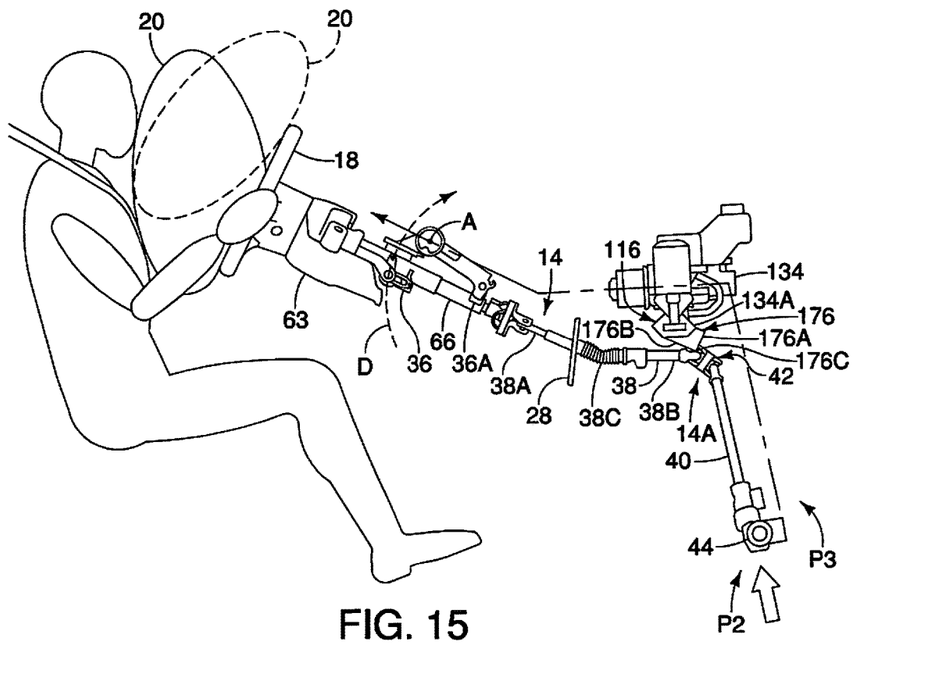
FIG. 15 is a side elevational view of the steering linkage of FIGS. 2 to 6 in the position after contacting the first modified energy absorption member of FIGS. 12 to 14.

The first shaft 38 will now be discussed in greater detail with reference to FIGS. 4 to 6 and 14. The first shaft 38 has a first end 38A and a second end 38B. The first end 38A of the first shaft 38 is coupled to the steering column 36 in a conventional manner, as best seen in FIG. 14. The second end of the first shaft 38 is coupled to the joint 42 in a conventional manner, as best seen in FIG. 6. The first shaft 38 includes a prescribed deformation section 38C disposed between the first and second ends 38A and 38B. As stated previously only one of the first second shafts 38 and 40 of the steering linkage 14 includes the prescribed deformation section 38C while the other of the first and second shafts 38 and 40 is a more rigid shaft that does not include a prescribed deformation section. Thus, in the illustrated embodiment, the second shaft 40 is more rigid than the prescribed deformation section 38C. The prescribed deformation section 38C is preferably disposed approximately midway on the first shaft 38.

Upon frontal impact, the front and rear wheels FW and RW and the vehicle frame 24 stops while the vehicle body 26 and its components maintain a momentum in the forward direction. The difference in the direction of the momentums of the vehicle body 26 with respect to the vehicle frame 24 causes the frontal impact to have a vertical displacement component. The vertical displacement component of the frontal impact causes the steering linkage 14 to displace upward. The vertically upward and rearward displacement causes the prescribed deformation section 38C to deform in a downward direction so that the prescribed deformation section 38C has a flattened V-shaped configuration after deformation. The deformation of the prescribed deformation section 38C causes the abutment 14A to contact the energy absorption member 16.

In the illustrated embodiment, a preferred distance between the energy absorption member 16 and the abutment 14A is directly proportional to a length of the prescribed deformation section 38C. Thus, it is preferable that the energy absorption member 16 is spaced by a distance from the abutment 14A that is approximately the length of the prescribed deformation section 38C. It is also preferred that the prescribed deformation section 38C has an axial length such that the prescribed deformation section 38C has a single bending area. Alternatively, the steering linkage 14 can be positioned such that the steering linkage contacts the energy absorption member 16 in an original undeformed state. In this instance, the abutment 14A of the steering linkage 14 is already contacting the energy absorption member 16 prior to the frontal impact. It is not necessary for the first shaft 38 to have the prescribed deformation section 38C when the abutment 14A is already contacting the energy absorption member 16. In the illustrated embodiment, the prescribed deformation section 38C includes a plurality of bellows. It will be apparent to one skilled in the art from this disclosure that the prescribed deformation section 38C can include a variety of flexible, bendable, or deformable members as needed and/or desired.

The energy absorption member 16 will now be discussed in greater detail with reference to FIGS. 2 to 6. The energy absorption member 16 is a durable member that is sized and constructed to withstand the energy transferred from the steering linkage 14. In the first embodiment, the energy absorption member 16 is a part of the brake booster 34. Namely, the brake booster 34 has a housing that constitutes the energy absorption member. As stated previously, the brake booster 34 is mounted on the dash wall 28 at the reinforced portion of the dash wall 28. As shown, the energy absorption member 16 is mounted adjacent and above the opening 28A of the dash wall 28. Preferably, the housing (i.e., the energy absorption member 16) of the brake booster 34 includes a downward protruding surface 16A that is configured to engage the abutment 14A. The surface 16A can be considered a first contact surface of the energy absorption member 16. The brake booster 34 can be a vacuum style booster or a hydraulic style booster. Depending on the type of the brake booster 34, the brake booster 34 can be reinforced or supplemented by an attachment member as needed and/or desired to enhance engagement with the abutment 14A.

The steering column 36 will now be discussed in greater detail with reference to FIGS. 2 and 14. The steering column is illustrated in FIG. 14 as having a housing 63 and without the housing 63 in FIG. 2. The steering column 36 is disposed on the passenger compartment side of the dash wall 28 by the cross-bar 29. The rearward displacement of the steering linkage 14 into the passenger compartment 32 causes the steering column 36 to pivot in the upward direction D about the axis A at the mounting portion 64. Preferably, given the arrangement of the energy absorption member 16 and the abutment 14A, the pivoting angle is limited to 5 degrees or less due to the contact of the abutment 14A and the energy absorption member 16. Even more preferably, the pivoting angle is limited to 4 degrees or less. Ideally, the pivot angle of the steering column is limited to 3 degrees or less. The steering column 36 includes an inner steering shaft 64, a first portion 66 and a second portion 68. The first portion 66 is a tubular support body of the steering column 36. The second portion 68 is a mounting bracket that is attached to the cross-bar 29. The first and second portions 66 and 68 are connected by the breakaway portion 36A.

The first portion 66 includes an outer tube 70 and an inner tube 72. The outer tube 70 telescopically receives the inner tube 72. In other words, the inner tube 72 is extendible within the outer tube 70. The inner steering shaft 64 is rotatable relative to the outer and inner tubes 70 and 72. The inner steering shaft 64 is operatively coupled to the first shaft 38. The inner steering shaft 64 extends through the inner tube 72 and the outer tube 70 so that it extends through the first portion 66. The inner steering shaft 64 is additionally operatively coupled to the steering wheel 18 and receives the steering input from the steering wheel 18 to be transferred to the other components of the steering linkage 14.

The second portion 68 of the steering column 36 is attached to the first portion 66 at a first attachment part 68A and a second attachment part 68B of the second portion 68. The first attachment part 68A can include the breakaway portion 36A that is a weakened area with respect to the first and second portions 66 and 68. After the frontal impact, the rearward displacement of the steering linkage 14 and the continued frontward movement of the passenger can cause the breakaway portion 36A to tear. As a result, the first and second portions 66 and 68 of the steering column 36 can separate at the breakaway portion 36A to further limit the pivot angle of the steering column 36 about the axis A. Thus, the first and second portions 66 and 68 are configured to separate at the breakaway portion 36A upon the rearward displacement of the steering linkage 14 resulting from frontal impact. The separation at the breakaway portion 36A can allow the inner tube 72 to move rearward relative to the second portion 66. This telescoping between the inner tube 72 and the second portion 66 further reduces the length of the steering column 36 and protects the driver during frontal impact.

Figure 10:
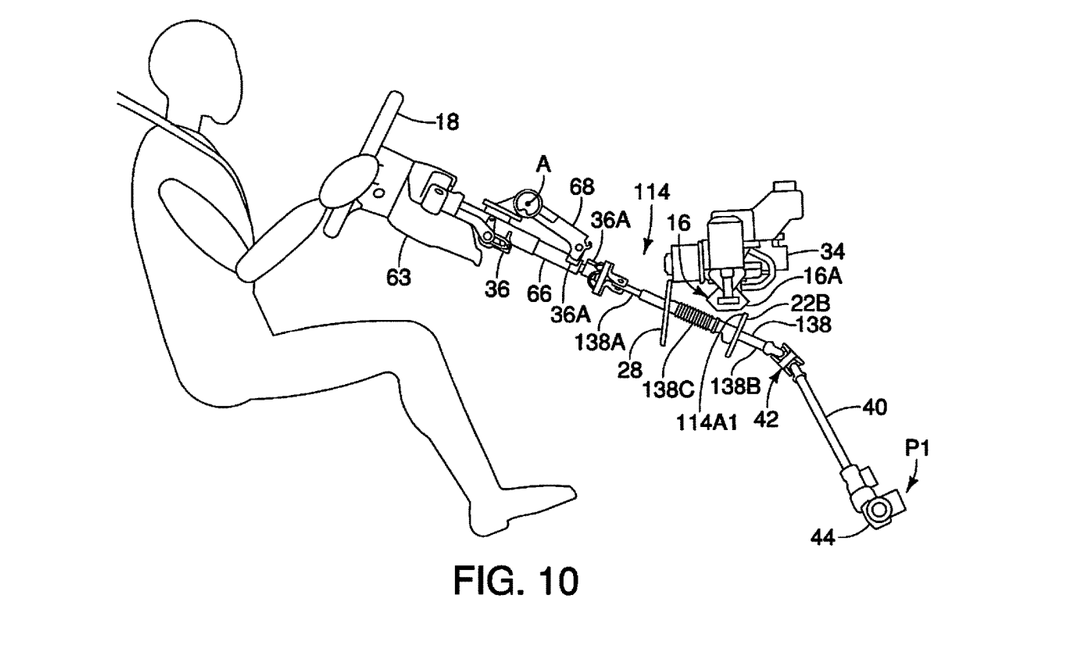
FIG. 10 is a side elevational view of a first modified steering linkage of FIGS. 2 to 6 in which an abutment is disposed on a shaft of the steering linkage, the steering linkage being in the position prior to contacting the energy absorption member.
Figure 11:
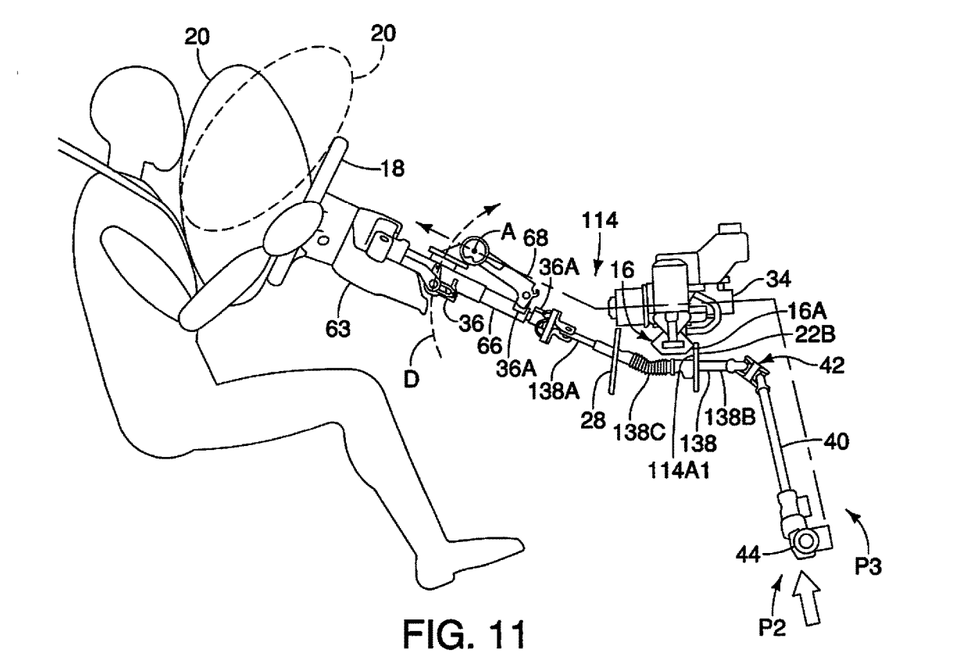
FIG. 11 is a side elevational view of the steering linkage of FIG. 10 after a frontal impact in which the modified steering linkage is in the position after contacting the energy absorption member.

Referring now to FIGS. 10 and 11, a first modification of the steering shaft 114 will now be discussed. Due to the similarity between the steering shaft 114 and the steering shaft 14, corresponding components in the steering shaft 114 will receive the same reference numeral as the steering shaft 14 but increased by 100. Components of the steering shaft 114 that are identical to components in the steering shaft 14 will receive the same reference numeral.

Here, the steering shaft 114 includes an abutment 114A1 as an alternative to the abutment 14A formed by the joint 42. The abutment 114A1 is disposed on the first shaft 138. As shown, the abutment 114A1 protrudes in an upward direction to contact the energy absorption member 16 upon frontal impact. In the illustrated embodiment, the abutment 114A1 is fixedly attached to the first shaft 138 between the second end 138B and the prescribed deformation section 38C. The abutment 114A1 has a contact surface that preferably extends substantially perpendicularly from the first shaft 138 to engage the energy absorption member 16. The abutment 114A1 is constructed of a rigid metallic material (e.g., steel) and can be fixedly attached to the first shaft 138 by welding or other suitable means. In the illustrated embodiment, the abutment 114A1 is an annular ring. It is preferable that the abutment 114A1 extends annularly from the first shaft 138 so that the abutment 114A1 always protrudes in the upward direction from the first shaft 138 during steering and rotation of the first shaft 138.

Figure 12:
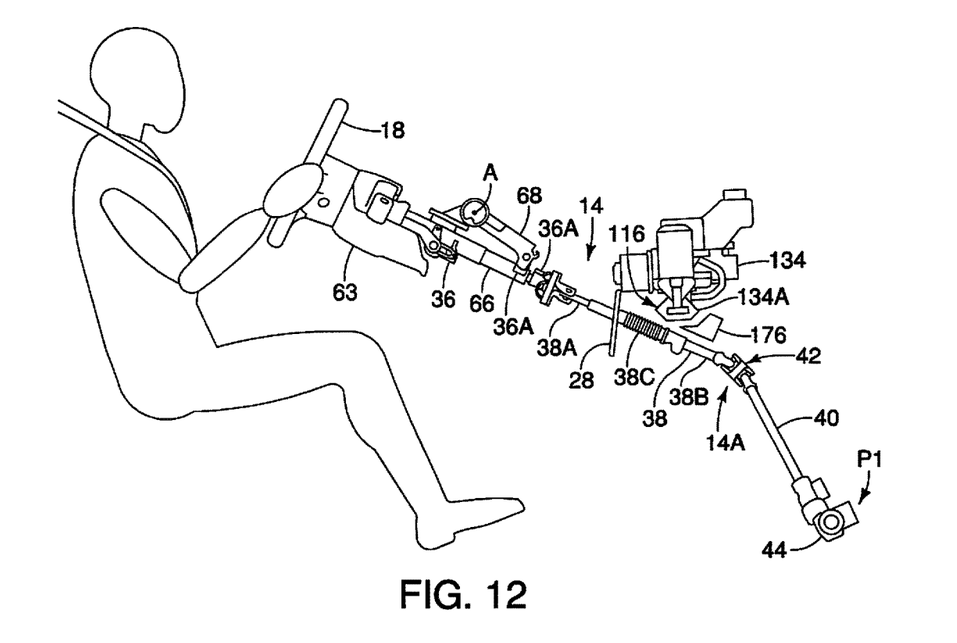
FIG. 12 is a side elevational view of the steering linkage of FIGS. 2 to 6 in the position prior to contacting a first modified energy absorption member that has an attachment member.
Figure 13:
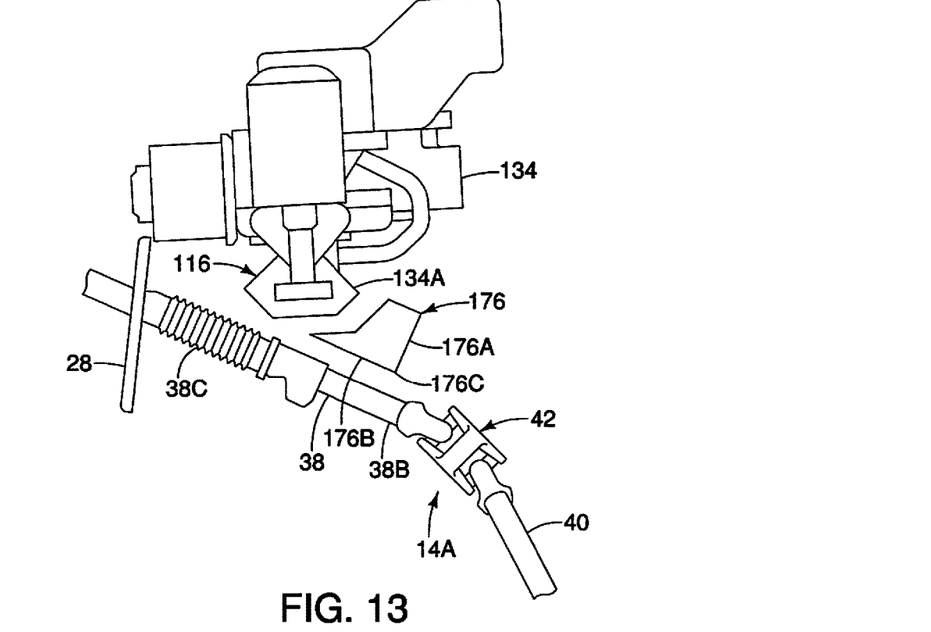
FIG. 13 is an enlarged side elevational view of the first modified energy absorption member of FIG. 12.

Referring now to FIGS. 12 and 13, a first modification to the brake booster 134 will now be discussed. Due to the similarity between the brake booster 134 and the brake booster 34, components of the brake booster 134 that are identical to corresponding components of the brake booster 34 will receive the same reference numerals. The brake booster 134 includes an attachment member 176 disposed on a lower portion 134A of the brake booster 134. Preferably, the attachment member 176 is a rigid member constructed of a metallic material such as aluminum or steel die cast. The attachment member 176 can be fixedly attached to the brake booster 134 by being welded to the lower portion 134A of the brake booster 134. Alternatively, the attachment member 176 can be fixedly attached to the brake booster 134 with fasteners or alternative methods. The attachment member 176 can also include a cast change of the brake booster 134. Thus, the attachment member 176 can be a one-piece integral member with the brake booster 134.

With the brake booster 134 having the attachment member 176, the attachment member 176 is configured to contact the abutment 14A formed by the joint 42. Thus, the brake booster 134 is also considered an energy absorption member 116. The brake booster 134 includes a first surface 176A and a second surface 176B forming a corner 176C therebetween. The corner 176c includes a contact surface configured to contact the abutment 14A formed by the joint 42 upon frontal impact. Preferably, the corner 176C has an approximately ninety-degree angle. Thus, preferably, the first surface 176A protrudes downward and perpendicularly from the brake booster 134. In the illustrated embodiment, the first surface 176A of the attachment member 176 is considered the contact surface that contacts the abutment 14A formed by the joint 42. As shown, due to the angled positioning of the brake booster 134 with respect to the steering linkage 14, the second surface 176B that is opposed to the first shaft 38 is inclined away from the first shaft 38 as the second surface 176B extends from the corner 176C towards the steering column 36.

The terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the above-discussed energy absorption arrangement. Accordingly, these terms, as utilized to describe the present invention should be interpreted relative to a vehicle equipped with the above-discussed energy absorption arrangement. The terms of degree such as "substantially" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle comprising:
   a vehicle support structure including a dash wall separating an engine compartment and a passenger compartment, the dash wall having an energy absorption member supported by the vehicle support structure on an engine compartment side of the dash wall; and
   a steering linkage extending through an opening of the dash wall between the engine compartment and the passenger compartment, the steering linkage including a steering column in the passenger compartment and an abutment spaced from the energy absorption member so that the abutment is configured to contact the energy absorption member upon a frontal impact of the vehicle to transfer energy from the steering linkage to the energy absorption member and to limit a rearward displacement of the steering linkage.

2. A vehicle comprising:
   a vehicle support structure including a dash wall separating an engine compartment and a passenger compartment, the dash wall having an energy absorption member supported by the vehicle support structure on an engine compartment side of the dash wall; and
   a steering linkage extending through an opening of the dash wall between the engine compartment and the passenger compartment, the steering linkage including a steering column in the passenger compartment and an abutment positioned and configured to contact the energy absorption member upon a frontal impact of the vehicle to transfer energy from the steering linkage to the energy absorption member and to limit a rearward displacement of the steering linkage, the energy absorption member being mounted adjacent and above the opening of the dash wall.

3. The vehicle according to claim 1, wherein
   the steering linkage includes a first shaft, a second shaft and a joint interconnecting the first and second shafts.

4. The vehicle according to claim 3, wherein
   the abutment is disposed on the joint.

5. The vehicle according to claim 4, wherein
   the first shaft includes a prescribed deformation section and the second shaft is more rigid than the prescribed deformation section.

6. The vehicle according to claim 5, wherein
the first shaft has a first end coupled to the steering column and a second end coupled to the joint, the prescribed deformation section being disposed between the first and second ends.

7. The vehicle according to claim 1, wherein
the energy absorption member is a part of a brake booster and the abutment is disposed on a constant velocity joint.

8. The vehicle according to claim 6, wherein
the energy absorption member includes a first surface and a second surface forming a corner therebetween, the corner having an approximately 90 degree angle.

9. The vehicle according to claim 8, wherein
the second surface is opposed to the first shaft and is inclined away from the first shaft as the second surface extends from the corner towards the steering column.

10. The vehicle according to claim 1, wherein
the abutment contacts the energy absorption member during frontal impact to limit pivoting of the steering column resulting from the rearward displacement of the steering linkage.

11. The vehicle according to claim 10, wherein
the abutment is positioned relative to the energy absorption member to limit pivoting of the steering column to 5 degrees or less due to the contact of the abutment and the energy absorption member during frontal impact.

12. The vehicle according to claim 10, wherein
the abutment is positioned relative to the energy absorption member to limit pivoting of the steering column to 4 degrees or less due to the contact of the abutment and the energy absorption member during frontal impact.

13. The vehicle according to claim 1, wherein
the abutment is disposed on a constant velocity joint.

14. A vehicle comprising:
a vehicle support structure including a dash wall separating an engine compartment and a passenger compartment, the dash wall having an energy absorption member supported by the vehicle support structure on an engine compartment side of the dash wall, the energy absorption member being part of a brake booster; and
a steering linkage extending through an opening of the dash wall between the engine compartment and the passenger compartment, the steering linkage including a steering column in the passenger compartment and an abutment positioned and configured to contact the energy absorption member upon a frontal impact of the vehicle to transfer energy from the steering linkage to the energy absorption member and to limit a rearward displacement of the steering linkage.

15. The vehicle according to claim 14, wherein
the brake booster includes an attachment member disposed on a lower portion of the brake booster, the attachment member having a corner that includes a contact surface configured to contact the abutment upon frontal impact.

16. The vehicle according to claim 15, wherein
the attachment member is a one-piece integral member with the brake booster.

17. The vehicle according to claim 3, wherein
the abutment is disposed on the first shaft and protrudes in an upward direction to contact the energy absorption member upon frontal impact.

18. The vehicle according to claim 1, further comprising
the steering column includes a first portion and a second portion connected by a breakaway portion, the first and second portions being configured to separate at the breakaway portion upon a rearward displacement of the steering linkage resulting from frontal impact.

* * * * *